(12) United States Patent
Liu et al.

(10) Patent No.: US 7,269,669 B2
(45) Date of Patent: Sep. 11, 2007

(54) SHARING SINGLE HOST CONTROLLER WITH MULTIPLE FUNCTIONAL DEVICES

(75) Inventors: Wei Liu, Plano, TX (US); Feng Mo, Lewisville, TX (US); Kunquan Sun, Plano, TX (US); Yanbing Yu, Plano, TX (US); Yujie Zhu, Frisco, TX (US)

(73) Assignee: Sychip Inc, Plano, TX (US)

( * ) Notice: Subject to any disclaimer, the term of this patent is extended or adjusted under 35 U.S.C. 154(b) by 476 days.

(21) Appl. No.: 10/885,941

(22) Filed: Jul. 7, 2004

(65) Prior Publication Data

US 2006/0010266 A1  Jan. 12, 2006

(51) Int. Cl.
*G06F 13/14* (2006.01)

(52) U.S. Cl. .................. 710/8; 710/2; 710/38

(58) Field of Classification Search .............. None
See application file for complete search history.

(56) References Cited

U.S. PATENT DOCUMENTS

| | | | | |
|---|---|---|---|---|
| 5,841,424 A | * | 11/1998 | Kikinis ................... | 345/168 |
| 6,279,114 B1 | * | 8/2001 | Toombs et al. ............ | 713/300 |
| 6,820,148 B1 | * | 11/2004 | Cedar et al. ............... | 710/104 |
| 2003/0140129 A1 | * | 7/2003 | Livnat et al. ............. | 709/221 |
| 2005/0144385 A1 | * | 6/2005 | Mowery et al. ........... | 711/115 |

* cited by examiner

*Primary Examiner*—Ilwoo Park
(74) *Attorney, Agent, or Firm*—Peter V. D. Wilde

(57) ABSTRACT

Multi-media Memory Card (MMC) devices, Secure Digital (SD) devices, and Secure Digital Input Output (SDIO) devices connected to a single host controller with signals multiplexed to allow simultaneous activation of more than one device at a time.

16 Claims, 2 Drawing Sheets

SHARING SINGLE HOST CONTROLLER WITH MULTIPLE FUNCTIONAL DEVICES

FIELD OF THE INVENTION

This invention relates to implementing multiple functions with a single host controller, wherein the multiple functions are simultaneously active.

BACKGROUND OF THE INVENTION (Portions of the technical material contained in this section may not be prior art.)

Portable and wireless computer devices, such as PDAs, personal PCs, smart cell phones, etc. are becoming ubiquitous. For convenience, these devices are generically referred to here as PDAs. Many of these devices are equipped with SD slots to accommodate active integrated circuit cards. A common SD function is a memory function, and the cards may be any of a variety of memory cards. For example, one type of SD memory card is a multi-media card, or MMC, implemented using MMC circuits in the PDA. PDA units with WLAN wireless capability have SDIO interface circuits, and use SDIO cards. These provide the PDA with a wireless connection to a WLAN network. The SDIO card in this case carries an RF integrated circuit. The card may also have digital memory circuits to implement other SD functions. Other devices also use SD technology. Many digital cameras are provided with SD slots for SD memory cards. The SD card functions as the image storage medium. In these devices the memory circuit in the card may be very large, to allow many pictures to be stored. Cell phones may also be provided with SDIO capability. These are often referred to as Smartphones. In many of these prior art devices, the PDAs have a single SD function and have dedicated controller units to manage and switch data for the single function.

Recent advances in PDA design and functionality allow more than one function to be accommodated in one PDA device. In these PDAs, a microprocessor host controller is designed to be switched by the user between functions, and to organize and distribute data in response to commands by the user. For example, Intel® PXA250 Microprocessor MMC Controller, originally designed as a single function (MMC) controller, now supports MMC/SD/SDIO functions. See Intel Application Note 278533-001, February 2002, incorporated herein by reference.

A multi-function PDA device may employ a single SD slot, with a separate card for each function. Or it may use cards that contain more than one function. An especially useful multi-function card contains an SDIO function for WLAN communication. See for example U.S. patent application Ser. No. 10/839,901, now U.S. Pat. No. 7,170,754 B2, entitled SDIO MEMORY AND INTERFACE CARD, filed May 6, 2004, and incorporated herein by reference.

In the multi-function PDAs of the prior art, the microprocessors are designed to switch between functions depending on the needs of the user. Thus the multiple functions, while they may present a very large variety for the user, are available only one at a time.

SUMMARY OF THE INVENTION

We have recognized a need for a PDA device, and a PDA microprocessor controller, that allows simultaneous operation of multiple functions. A multiple function PDA is especially desirable when one of the multiple functions is a SDIO function. This capability extends the versatility of PDA devices into new dimensions. For example, in the case of a digital camera, the state of the art allows images that are stored in the MMC to be transmitted to a remote station using a wireless SDIO function. According to the invention, the MMC and SDIO functions may be activated simultaneously, allowing the images to be transmitted in virtual real time. Thus a digital camera may transmit images as they are taken. A simple buffer memory can replace or supplement the use of a large MMC. This is but one example of the versatility provided by simultaneously operating multiple functions.

Simultaneous multiple functions are implemented by connecting all of the functional devices to the host controller, and multiplexing the command signals and the content data to and from the host controller to the individual devices. The interconnection may be implemented using a dynamic switching matrix that allows the host controller to switch from one functional device to another using signal responses from the functional devices.

DETAILED DESCRIPTION

Figure 1:
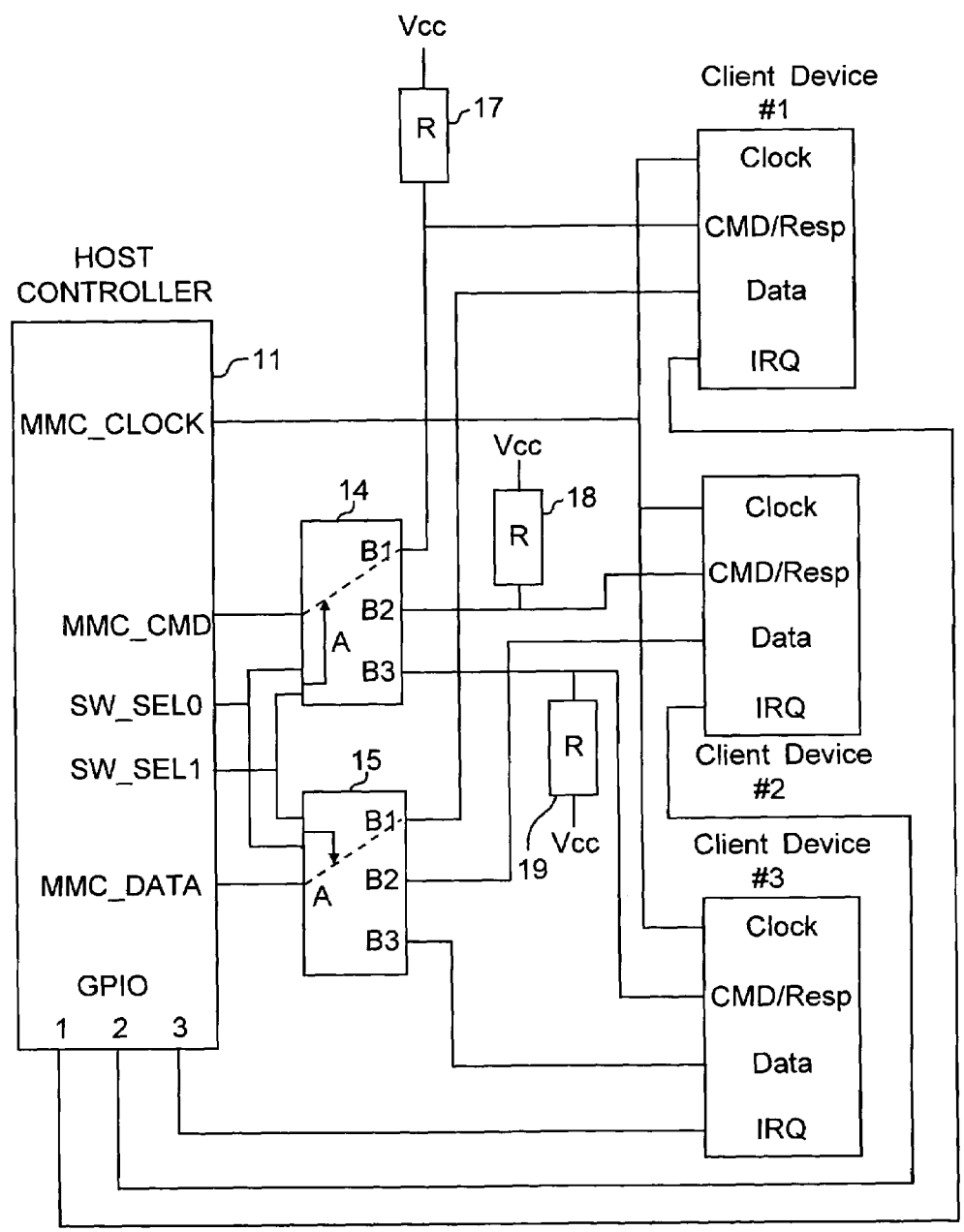
FIG. 1 is a diagram showing one circuit embodiment for implementing the invention.

With reference to FIG. 1, the host controller 11 is a microprocessor module such as the Intel® PXA250 Microprocessor MMC Controller. It should be understood that this particular controller unit is described here by way of example only. Other processors, such as the Qualcomm® MSM6500 devices, can be used. In the example shown in FIG. 1, the host controller 11 communicates with three devices, labeled client devices #1, #2, #3. One or more of the client devices may be part of the PDA itself, or may reside on an SD card. In a preferred case, one of the client devices comprises an SD card slot and SD card containing an SDIO function. The SD card containing the SDIO function may also have another function, for example, a large memory. Thus client device #1 may be the SD memory, and client device #2 may be the SDIO. Client device #3 may be a multi-media memory, MMC. All three client devices may reside on one or more SD cards, or one or more client devices may be part of the PDA. It should be apparent that three client devices are chosen by way of example. Any number of two or more client devices may be used for the invention.

The client devices are interconnected to controller 11 through switching devices 14, 15. In the example, with three client devices, the switches are SP3T switches as shown.

Also in the example illustrated here, the simultaneous multiple functions are implemented with a 1-bit bus for controller 11. The Intel processor referred to above has a 1-bit bus for each of the MMC/SD/SDIO functions. It also has a 4-bit star bus for the SD memory and the SDIO functions. A four-bit bus implementation of the invention is also contemplated, and will be mentioned again below.

Controller 11 has one dedicated command signal MMC_CMD, and one dedicated data signal MMC_DATA, which limits this specific configuration to the 1-bit bus implementation. The command, MMC_CMD, transmits commands and receives responses from each of the client devices over lines that are multiplexed through switches 14, 15 to the MMC_CMD port on controller 11. Likewise the data signals from all three client devices are transmitted in sequential time slots through switches 14, 15, to the MMC_DATA port on controller 11. The time slots for data transmission, are synchronized by MMC_CLOCK, which is connected to all three client devices.

The GPIO ports on the controller are configured as interrupts for the three clients devices, and connected to the IRQ signals (usually through the CD and WP contacts on the card socket) on the three device cards.

In operation, the switch selection lines SW_SEL0, SW_SEL1 select the client devices for connection to the host controller. In the switch configuration shown the MMC_CMD and MMC_DATA ports of the host controller are connected to client device #1. If client device #1 is operating, data is exchanged between client device #1 and the host processor. When the data transaction for client device #1 is finished, switches 14 and 15 are reset to interconnect client device #2 with the host controller. Data is then exchanged between client device #2 and the host controller. Similarly, data is exchanged between client device #3 and the host controller. Interrupt signals from the IRQ ports of the client devices indicate which client devices are active. During the clock sequence when a given client device is not connected through switches 14 and 15 to the host controller, the CMD/Resp lines from the client devices need to be high to avoid misreading a low voltage condition as a starting bit of a command signal. Pull-up resistors 17 on the CMD/Resp lines overcome this problem.

As will be understood from FIG. 1, the MMC/SD device driver on the host processor operates the switch select ports and the switches 14, 15, to connect the client devices between the command/response and data transfer/acknowledgement transaction. This enables the MMC/SD/SDIO port sessions between the host and the different client devices to occur essentially concurrently, and the user will see virtually simultaneous operation of the multiple client devices. This is possible since the MMC/SD/SDIO specifications require that the transmission from the client devices be initiated by the host. This makes it possible for the host to know when and what type of transmission (response, data, and acknowledgement) will be performed by the client device and allows the controller to wait until such transmission is complete before switching to a different client device. When switching between clients, the CLOCK line is disabled at the LOW level and the CMD lines on the host and all client devices are pulled to logic level HIGH. Under these operating conditions, the multiple MMC/SD/SDIO client devices can operate virtually simultaneously, sharing the bandwidth available on the host MMC/SD/SDIO controller. In this device, all multiplex switching is initiated by the host controller in response to CMD/Response signals from the client devices.

If the host controller is provided with 4-bit bus capability for the command and data ports, and the controller thus has four lines for these functions, the invention is easily implemented by adding switching elements to the additional three lines. In 4-bit operation of the SDIO client device, the interrupt on the GPIO pins connected to the IRQ pin of the client devices should be disabled when the client device is switched in (connected to the host controller), and should be enabled when the client device is switched out (disconnected from the host controller). In the 1-bit SDIO mode, the GPIO interrupts may be enabled all the time during power up of the client devices.

Figure 2:
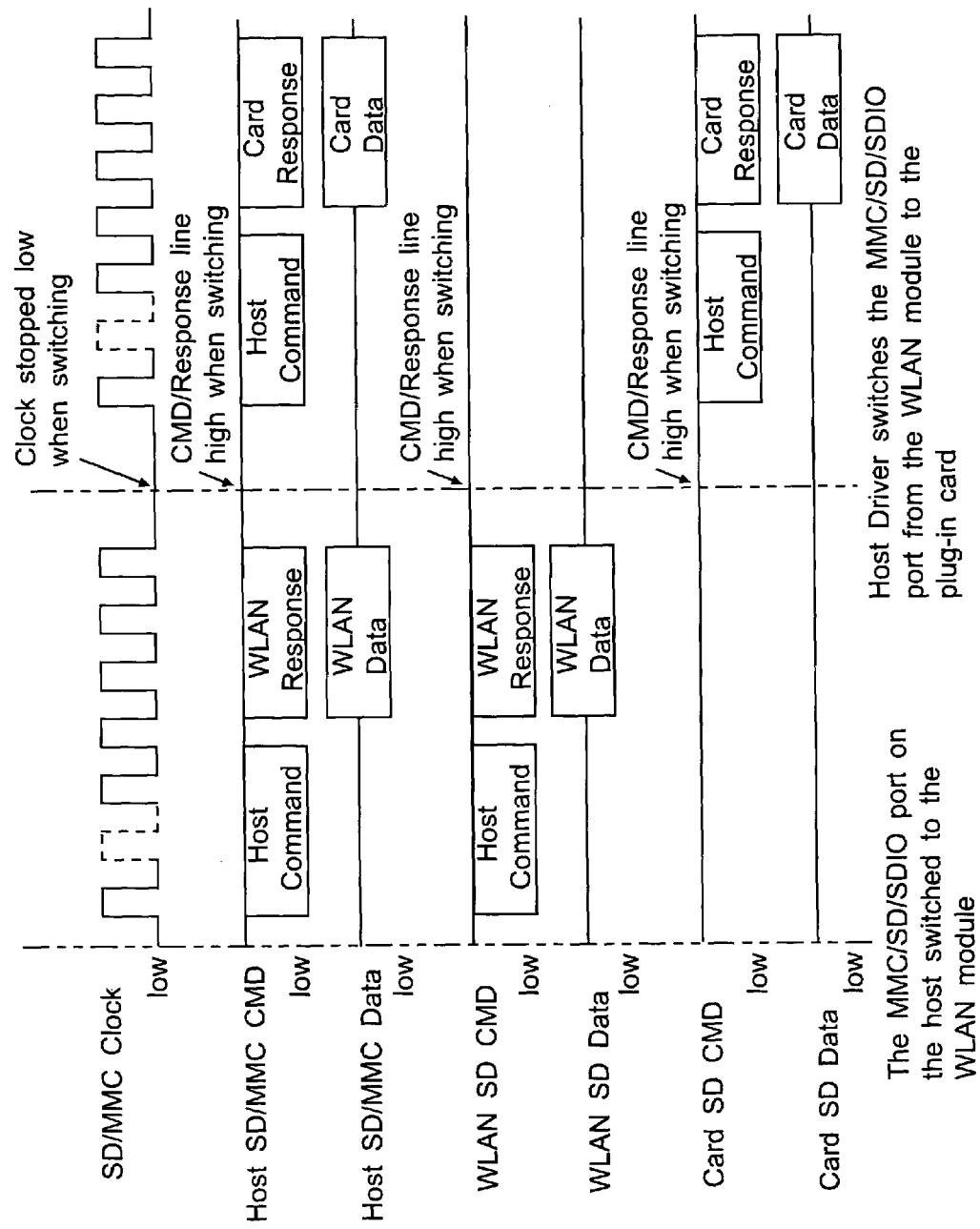
FIG. 2 is a schedule of software commands for operating the circuit of FIG. 1.

A time slot diagram showing operation of an SDIO client device (802.11b WLAN module) and an external SD card is shown in FIG. 2. During the first seven clock cycles shown, the host controller sends a command and receives data from the client device #1, in this example the SDIO device. The controller then activates switches 14 and 15 to switch from the B1 positions to the B2 positions and interconnect client device #2, in this example an external SD card. The host processor sends commands and receives data from the SD card. The duration of the interchange transaction is indicated here as seven clock cycles but, as indicated earlier, since the controller controls both send and receive from each client device, the transactions may be longer or shorter. Switching from one client device to another, on the time scale implied above, is referred to as multiplexing, that is, transactions are multiplexed. The term "transaction", as used here, is well known in the PDA art.

FIGS. 1 and 2 are given by way of example only of the large number of circuit and software alternatives made possible using the simultaneous multiple function teachings of the invention.

PDA device as used herein means a portable device, usually a hand-held device, and includes computers, cameras, cellphones, etc. PDA-SD device is a PDA device with at least one SD slot.

Functional devices as used herein means devices that provide independent functions such as voice communications, wireless interface, images, video, general-purpose memory, etc. A combination of functional devices means any combination of the above provided as separate devices in a PDA, separate SD cards, combinations in a PDA and combinations on a single SD card, or provided by another interconnected device, e.g. a plug-in accessory device (not a card). Where two or more functions are built into a single SD card or other plug-in, the two or more functions are considered independent functions.

Switching matrix means a combination of at least two switching elements, each of the elements having 1 xn switching capability, where n is the number of functional devices served by the host controller.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. Personal Digital Assistant-Secure Digital (PDA-SD) device with n functions comprising:
   a. a host controller,
   b. a functional device in the PDA-SD device,
   c. a Secure Digital Input Output (SDIO) card slot,
   d. a switching matrix comprising at least two 1 xn switching elements,
   the switching elements having a 1 x node and at least two xn nodes, with the 1 x nodes of the switches connected to the host controller, and the xn nodes connected to the functional device and the SDIO card slot respectively, the switching matrix being activated by command signals from the host controller, and wherein each functional device has an information request port, the host controller has multiple general purpose IO (Input Output) ports and each information request port is connected to a separate general purpose IO port.

2. The device of claim 1 further including at least one additional Secure Digital (SD) card slot connected to the switching matrix.

3. The device of claim 1 wherein the switching matrix comprises a single pole multiple throw switch.

4. The device of claim 1 wherein the host controller is an MMC/SD/SDIO controller.

5. The PDA-SD device of claim 1 wherein each functional device has a data port, and the data port is connected to the host controller through the switching matrix.

6. The PDA-SD device of claim 5 wherein the data port comprises a 1-bit data bus.

7. The PDA-SD device of claim 5 wherein the data port comprises a 4-bit data bus.

8. The PDA-SD device of claim 5 wherein each functional device has a command/response port, and the command response port is connected to the host controller through the switching matrix.

9. A method for concurrently operating a host controller with at least a first functional device and a second functional device, wherein the functional devices have command/response ports and an information request port on each functional device is connected to a separate general purpose IO port on the host controller comprising establishing a command/response connection between the command/response port of the first functional device and the host controller, conducting a transaction between the first functional device and the host controller, switching the command/response connection to the second functional device and conducting a transaction between the second functional device and the host controller.

10. The method of claim 9 wherein the first and second functional devices each have data ports, and at least one transaction includes transmitting data between the functional devices and the host controller.

11. The method of claim 10 wherein one of the functional devices comprises a Secure Digital (SD) card slot.

12. The method of claim 11 wherein an SD card slot comprises a Secure Digital Input Output (SDIO) card slot.

13. The method of claim 12 wherein the SDIO card slot comprises a 1-bit data bus.

14. The method of claim 12 wherein the SDIO card slot comprises a 4-bit data bus.

15. The method of claim 10 wherein two functional devices comprise Secure Digital (SD) card slots.

16. The method of claim 9 wherein the host controller is a Multi-media Memory Card (MMC)/Secure Digital (SD)/Secure Digital Input Output (SDIO) controller.

* * * * *